D. H. GLASS.
INSECT TRAP.
APPLICATION FILED DEC. 10, 1914.

1,168,798.

Patented Jan. 18, 1916.

Witnesses

Inventor
D. H. Glass
By
Attorneys

UNITED STATES PATENT OFFICE.

DAVID H. GLASS, OF RUSHVILLE, ILLINOIS.

INSECT-TRAP.

1,168,798. Specification of Letters Patent. Patented Jan. 18, 1916.

Application filed December 10, 1914. Serial No. 876,541.

*To all whom it may concern:*

Be it known that I, DAVID H. GLASS, a citizen of the United States, residing at Rushville, in the county of Schuyler and State of Illinois, have invented certain new and useful Improvements in Insect-Traps, of which the following is a specification.

This invention relates to devices for trapping insects, more particularly moths, millers and like insects, and has for one of its objects to improve the construction and increase the efficiency and utility of a device of this character.

Another object of the invention is to provide a simply constructed device including a receiver in which a light is disposed to attract the insects, a receptacle with which the receiver communicates, and a fan or like blower to produce artificial air currents to force the insects which are attracted by the light into the receptacle.

Figure 1:
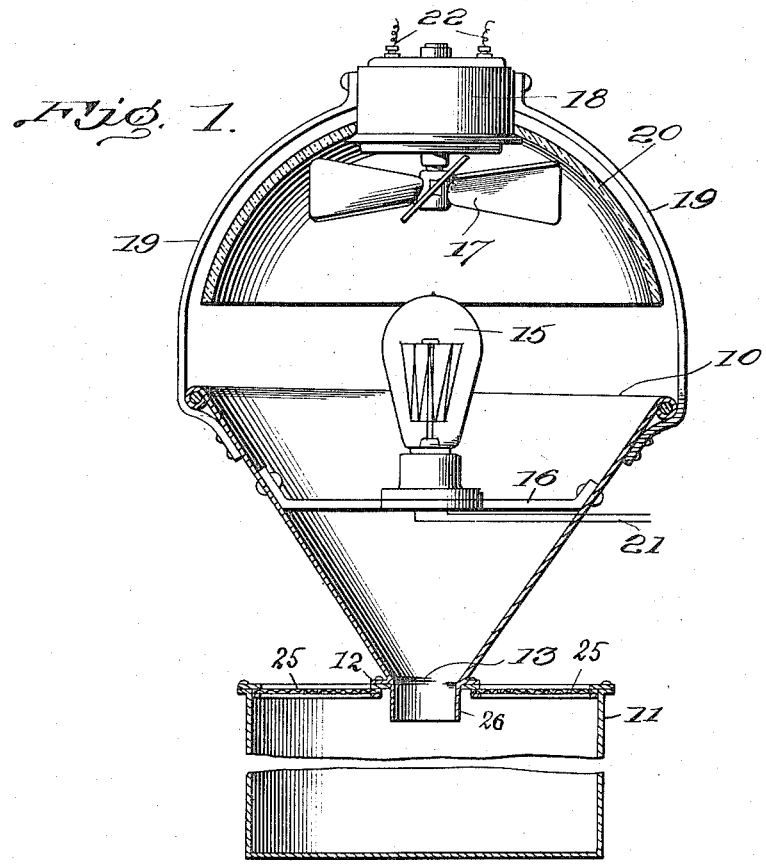
Figure 2:
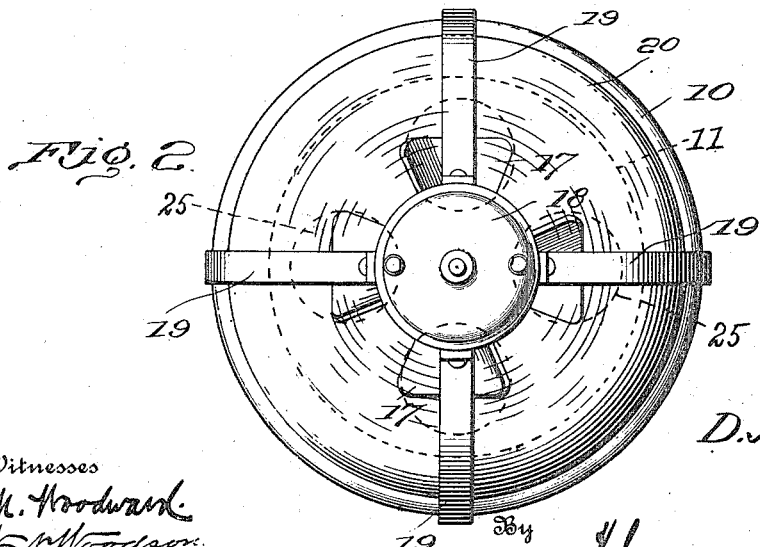

With these and other objects in view, the invention consists in certain novel features of construction as hereafter shown and described and then specifically pointed out in the claims; and in the drawings illustrative of the preferred embodiment of the invention, Figure 1 is a sectional elevation of the improved device; Fig. 2 is a plan view.

Corresponding and like parts are referred to in the following description and indicated in all the views of the accompanying drawings by the same reference characters.

The improved device includes a receiver, preferably funnel shaped, or with its discharge end relatively small, a receptacle communicating with the smaller end of the receiver, a light disposed within the receiver to attract the insects, and means for inducing artificial air currents through the receiver to force the insects which are attracted by the light into the receptacle.

The means for inducing the air currents is preferably located above the receiver and operates to produce downwardly directed air currents into the receiver.

The receiver is indicated as a whole at 10 in ordinary funnel shape, as shown in Fig. 1. The receptacle is represented conventionally at 11 and attached directly with the bottom of the funnel 10, as indicated at 12, the relatively small discharge 13 of the funnel leading directly into the receptacle.

Any suitable form of light may be employed in connection with the device, but for the purpose of illustration, a conventional incandescent lamp is shown and represented as a whole at 15 and preferably mounted upon a transverse bar 16 as small as possible consistent with the strains to which it will be subjected, to obstruct the passage of the insects as little as possible.

The fan or other current producing member is represented conventionally at 17, and for the purpose of illustration an ordinary electrically actuated fan is shown and arranged to be actuated by a motor represented conventionally at 18 and supported from the funnel by a plurality of bars or standards 19, the latter as small as possible consistent with the strains to which they will be subjected. A shield or guard 20, preferably of transparent material such as glass, is arranged to cover and protect the fan and to prevent the insects from coming in contact therewith, while at the same time permitting the light rays to freely pass through. The wiring for the light bulb 15 is indicated conventionally at 21, while the wiring for the motor is indicated conventionally at 22.

With a device thus constructed, it will be obvious that insects attracted by the light will be forced by the air currents into the receptacle 11 in which they may be destroyed and that every insect which approaches the light and which comes within the influence of the air currents will be destroyed.

The receptacle 11 is provided with relatively large openings in its upper part and covered by wire netting, as illustrated at 25, to provide for the escape of the air, and likewise to insure the proper circulation. The discharge 13 of the funnel 10 is preferably continued for a short distance to the receptacle 11, as shown at 26, to insure the passage of the insects into the bottom of the receptacle.

The improved device is simple in construction, can be constructed of any required size or capacity, but is particularly designed for use in orchards, summer gardens, parks and like localities to destroy insects which are a detriment to fruit, a damage to plants, foliage, and shrubbery, and a menace to the public, and which usually fly by night and are attracted by a light.

Having thus described the invention, what is claimed as new is:—

1. In a device of the class described, a receiver for insects having a converging inlet, an insect attracting medium centrally of the inlet of the receiver, a shield of transparent material corresponding in diameter with the inlet of the receiver and spaced at its lower edge above the same, and means located within the shield for inducing artificial air currents through the receiver.

2. In a device of the class described, a receiver for insects having a converging inlet, an insect attracting medium centrally of the inlet of the receiver, a hollow shield opening downwardly with its lower edge substantially in vertical alinement with the upper edge of the inlet of the receiver and spaced at its lower open side from the same, and means located within the shield for inducing artificial air currents through the receiver.

3. In a device of the class described, a receiver for insects, an insect attracting medium associated with the receiver, a motor having an annular flange, and a fan driven by the motor supported above the receiver, whereby induced air currents are caused to flow through the receiver, and a shield suspended from the flange of the motor and inclosing the fan, said shield being open at the lower side and spaced above the receiver.

4. A device of the class described comprising a receiver for the insects having a converging inlet, an insect attracting medium within the inlet, a motor having an annular flange, a fan device located beneath said motor and operated thereby, a plurality of supports connected at one end to the receiver inlet and at their other ends to the motor above the flange, a downwardly opening shield having an opening engaging around said motor and bearing upon the flange thereof and inclosing the fan, the lower edge of said shield being substantially in vertical alinement with the rim of the receiver inlet and spaced above the same.

In testimony whereof I affix my signature in presence of two witnesses.

DAVID H. GLASS. [L. S.]

Witnesses:
   JOHN C. WORK,
   B. K. INGLES.